United States Patent [19]

Sakurai et al.

[11] 4,381,252

[45] Apr. 26, 1983

[54] CATALYST FOR PRODUCING POLYOLEFINS

[75] Inventors: Hisaya Sakurai; Yoshihiko Katayama; Tadashi Ikegami; Masayasu Furusato, all of Kurashiki, Japan

[73] Assignee: Asahi Kasei Kogyo Kabushiki Kaisha, Osaka, Japan

[21] Appl. No.: 269,240

[22] Filed: Jun. 1, 1981

Related U.S. Application Data

[63] Continuation-in-part of Ser. No. 231,183, Jan. 29, 1981, abandoned, which is a continuation of Ser. No. 91,326, Nov. 5, 1979, abandoned.

[51] Int. Cl.³ .................................................. C08F 4/64
[52] U.S. Cl. .......................... 252/429 B; 252/429 C; 252/431 R; 526/128; 526/132; 526/151; 526/152; 526/153
[58] Field of Search ............ 252/429 B, 429 C, 431 R

[56] References Cited

U.S. PATENT DOCUMENTS

| | | | |
|---|---|---|---|
| 3,670,043 | 6/1972 | Kubicek et al. | 252/429 B X |
| 3,737,393 | 6/1973 | de Vries | 252/431 R |
| 3,989,878 | 11/1976 | Aishima et al. | 252/429 B X |
| 4,004,071 | 1/1977 | Aishima et al. | 252/429 C X |
| 4,027,089 | 5/1977 | Aishima et al. | 252/429 B X |
| 4,069,267 | 1/1978 | Kamienski et al. | 252/431 R X |
| 4,127,507 | 11/1978 | Fannin et al. | 252/431 R |
| 4,133,824 | 1/1979 | Malpass et al. | 252/429 C X |
| 4,172,050 | 10/1979 | Gessell | 252/431 R |
| 4,213,880 | 7/1980 | Knight et al. | 252/431 R |

FOREIGN PATENT DOCUMENTS 1299862 12/1972 United Kingdom ............... 526/151

*Primary Examiner*—Patrick Garvin
*Attorney, Agent, or Firm*—Sprung, Horn, Kramer & Woods

[57] ABSTRACT

A catalyst suitable for polymerizing an α-olefin, comprising a solid catalyst component [A] and an organometal compound [B], the solid catalyst component [A] being prepared by reacting an organomagnesium compound (1) soluble in a hydrocarbon medium and represented by the general formula,

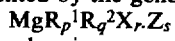

$MgR^1_p R^2_q X_r \cdot Z_s$ wherein $R^1$ is a hydrocarbon group having 2 to 3 carbon atoms;

$R^2$ is a hydrocarbon group having 4 to 20 carbon atoms and the difference in number of carbon atoms between $R^1$ and $R^2$ is at least 2;

X is an electronegative group having an oxygen atom, a nitrogen atom or a sulfur atom;

Z is an organometal compound of aluminum, boron, beryllium, zinc, silicon or lithium;

p and q each is a number above 0 to 1;

r is a number from 0 to 1;

$p+q+r=2$; and s is a number from 0.02 to 0.09, with a titanium and/or vanadium compound (2) having at least one halogen atom; and a process for polymerizing an α-olefin employing the same catalyst.

30 Claims, No Drawings

CATALYST FOR PRODUCING POLYOLEFINS

CROSS-REFERENCES TO RELATED APPLICATIONS

This application is a continuation-in-part of application Ser. No. 231,183, filed Jan. 29, 1981, now abandoned, which is a continuation of application Ser. No. 91,326, filed Nov. 5, 1979, now abandoned.

BACKGROUND OF THE INVENTION

This invention relates to a catalyst suitable for polymerizing an α-olefin and having a high activity and to a polymerization process employing such a catalyst.

DESCRIPTION OF THE PRIOR ART

It is known from Japanese Pat. No. 233,148 to K. Ziegler that polyethylene can be produced under a low pressure using a catalyst comprising an organomagnesium compound and a transition metal compound. The organomagnesium compound as such, however, is disadvantageously insoluble in an inert hydrocarbon medium employed for the preparation of the catalyst and the polymerization of ethylene and, as a result, the catalysts having a high activity have not been obtained.

It is also known from Japanese Patent Publication No. 40959/1972, Japanese Patent Application (OPI) No. 4392/1971 and British Pat. No. 1,299,862 that when the organomagnesium compound is used in a specific form there can be obtained catalysts having increased activity. Such organomagnesium compounds include, for example, complexes of an organomagnesium halide, i.e. a so-called Grignard reagent with an ether, and organomagnesium alkoxides. The catalysts comprising these organomagnesium compounds have a comparatively high activity per transition metal atom but it is not possible completely to omit the catalyst removal step in a process of producing polyethylene because the amount of halogen atoms remaining in the polymers obtained is still large.

Some of the co-inventors of this invention proposed in U.S. Pat. Nos. 3,989,878, 4,004,071 and 4,027,087 a series of complex compounds soluble in an inert hydrocarbon medium and comprising an organomagnesium compound and an organozinc compound, an organoboron compound and an organoberyllium compound in a specific ratio which have a much higher activity than the conventional catalysts and enable complete omission of the catalyst removal step.

As a result of intensified studies on the catalyst system comprising an organomagnesium compound, the inventors have discovered that without using the above described complex compounds having a specific composition, catalysts having a very high activity and suitable for polymerizing an α-olefin can be obtained by reacting a solid catalyst component with an organometal compound, the solid catalyst component being prepared by reacting an organomagnesium compound soluble in an inert hydrocarbon medium with a titanium and/or vanadium compound.

According to this invention there is provided a catalyst suitable for polymerizing an α-olefin, comprising [A] a solid catalyst component and [B] an organometal compound, wherein the solid catalyst component [A] is prepared by reacting (1) an organomagnesium compound soluble in a hydrocarbon medium and represented by the general formula, $MgR^1_p R^2_q X_r Z_s$ wherein $R^1$ is a hydrocarbon group having 2 to 3 carbon atoms;

$R^2$ is a hydrocarbon group having 4 to 20 carbon atoms and the difference in number of carbon atoms between $R^1$ and $R^2$ is at least 2;

X is an electronegative group having an oxygen atom, a nitrogen atom or a sulfur atom;

Z is an organometal compound of aluminum, boron, beryllium zinc, silicon or lithium, p and q each is a number above 0 to 1, r is a number from 0 and up to 1, p+q+r=2, and s is a number from 0.02 to 0.09 with (2) a titanium and/or vanadium compound having at least one halogen atom.

Also, according to this invention there is provided a process for the production of polyolefins by using the same catalyst.

One of the characteristic features of this invention is a very high catalystic efficiency. Owing to this feature, the amount of catalyst residues such as transition metals and halogen atoms remaining in the polymers produced is small. Accordingly, the catalyst of this invention is suitable for a polymerization process which does not require any catalyst removal step.

Another characteristic feature of this invention is that the polymers produced have a uniform particle size and do not contain large coarse particles which cause trouble in a continuous polymerization, and further they have a high bulk density.

Still another characteristic feature of this invention is that the molecular weight distribution of polymers can be easily controlled within wide limits.

The polymers obtained by using the above described catalyst of this invention have high molecular weight, high rigidity, narrow molecular weight distribution and high impact strength.

Furthermore, in order to broaden the molecular weight distribution of polymers with a high catalytic activity, the solid catalyst component [A] before being reacted with the organometal compound [B] is additionally reacted with an inorganic or organic compound (3) of aluminum, silicon, tin or antimony or a titanium or vanadium compound (4) to give a solid type catalyst component [A']. This solid type catalyst component [A'] is employed together with the organometal compound [B] as the catalyst of this invention. Or the solid catalyst component [A] or the solid type catalyst component [A'] together with the organometal compound [B] is further combined with a halogenated hydrocarbon [C]. By employing the solid type catalyst component [A'] together with the organometal compound [B] or the solid catalyst component [A] or the solid type catalyst component [A'] together with the organometal compound [B] in combination with the halogenated hydrocarbon [C], there can be obtained polymers having a broader molecular weight distribution suitable for blow-molding or film- or sheet-extrusion.

DETAILED DESCRIPTION OF THE PREFERRED EMBODIMENTS

Each of the component materials and reaction conditions employed for the preparation of the catalyst of this invention will be described hereinafter in detail.

The organomagnesium compound (1) which can be employed for preparing the solid catalyst component [A] of this invention is represented by the general formula, $MgR_p^1R_q^2X_r.Z_s$ wherein $R^1$, $R^2$, X, Z, p, q, r and s are the same as defined above.

In this formula, $R^1$ is a hydrocarbon group having 2 to 3 carbon atoms. Exemplary hydrocarbon groups include an ethyl group, a propyl group and an isopropyl group. Of these groups, an ethyl group is preferred. In the above described formula, $R^2$ is a hydrocarbon group having 4 to 20 carbon atoms. Exemplary hydrocarbon groups include a butyl group, a pentyl group, a hexyl group, a heptyl group, an octyl group, a nonyl group, a decyl group, a dodecyl and a hexadecyl group. Of these groups, a butyl group, a pentyl group and a hexyl group are preferred. The difference in number of carbon atom between $R^1$ and $R^2$ of at least 2 is an important factor for rendering the organomagnesium compound (1) soluble in an inert hydrocarbon medium at high concentrations. Suitable examples of the electronegative group having an oxygen atom, a nitrogen atom or a sulfur atom include an alkoxy group having 1 to 20 carbon atoms, a siloxy group, a phenoxy group, a substituted phenoxy group, an amino group, an amide group, a

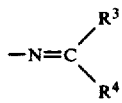

group wherein $R^3$ and $R^4$ may be the same or different and each is a hydrocarbon group having 1 to 20 carbon atoms, a $-SR^5$ group wherein $R^5$ is a hydrocarbon group having 1 to 20 carbon atoms, and β-ketoacid group.

Of these groups, an alkoxy group having 1 to 20 carbon atoms and a siloxy group are preferred.

In this Application the term "organometal compounds" means metal compounds having a hydrocarbon group or an alkoxy group directly connected to a metal atom.

Exemplary organometal compounds of aluminum, boron, beryllium, zinc, silicon or lithium represented by Z include a trialkylaluminum, an alkylaluminum alkoxide, a trialkoxyaluminum, a dialkylberyllium, a trialkylboron, a dialkylzinc, a tetralkylsilane, a trialkylhydroxysilane and an alkyllithium. Of these organometal compounds, an organoaluminum compound of the general formula, $AlR^6(OR^7)_{3-n}$ wherein $R^6$ and $R^7$ may be the same or different and each is a hydrocarbon group having 1 to 20 carbon atoms, and n is a number from 0 to 3.

is preferred. A trialkylaluminum, an alkylaluminum alkoxide and a trialkoxyaluminum are more preferred.

p and q are numbers above zero to 1 and r is a number from zero to 1 and p+q+r=2. When r ranges from zero to 0.6, the catalytic activity is increased. r is an important factor for a molecular weight distribution of polymer, and when r ranges from 0.2 to 0.6, both a narrow molecular weight distribution of the polymer produced and a high catalytic activity can be achieved. s is a number from 0.02 to 0.09 and this range is very important to obtain polymers having superior particle properties.

These organomagnesium compounds can be prepared by the following methods:

(1) By reacting a reaction product of an organohalide of $R^1W$ wherein $R^1$ is the same as defined above and W is a halogen atom, and magnesium metal, i.e., a so-called Grignard reagent, with an organolithium compound $R^2Li$ wherein $R^2$ is the same as defined above.

(2) By reacting an organohalide $R^1W$ and an organohalide $R^2W$ with magnesium metal simultaneously or successively and then reacting the reaction product with an organometal compound Z.

(3) By adding an organometal compound Z to magnesium metal and reacting the reaction product with an organohalide of $R^1W$ and an organohalide $R^2W$ simultaneously or successively.

(4) By mixing a compound $MgR_2^1$ with a compound $MgR_2^2$ in an inert hydrocarbon medium and reacting the mixture with an organometal compound Z.

The introduction of an electronegative group X is conducted by reacting an organomagnesium compound of the formula, $MgR_p^1R_q^2$ or $MgR_p^1R_q^2.Z_s$ wherein $R^1$, $R^2$, Z, p, q and s are the same as defined above, with a reagent selected from the group consisting of oxygen, an alcohol, an organic acid, an ester of an organic acid, an aldehyde, a ketone, a silanol, a siloxane, an amine, a nitrile and a mercaptan. Exemplary reagents include, in addition to oxygen, ethanol, propanol, butanol, hexanol, octanol, acetic acid, propionic acid, butanoic acid, benzoic acid, methyl acetate, butyl propionate, acetaldehyde, acetone, methyl ethyl ketone, acetylacetone, trimethylsilanol, triphenylsilanol, dimethyldihydrodisiloxane, cyclic methylhydrotetrasiloxane, methylhydropolysiloxane, phenylhydropolysiloxane, acetonitrile, benzonitrile, methylamine, dimethylamine, ethylamine, diethylamine, phenylamine, methyl mercaptan, propyl mercaptan and butyl mercaptan.

The method of introducing the electronegative group X which can be employed is described in G. E. Coats and K. Wade, *Organometal Compounds*, Vol. 1, published by Methuen & Co., Ltd.

Exemplary titanium and/or vanadium compounds (2) having at least one halogen atom which can be employed for preparing the solid catalyst component [A] of this invention include the halides, the oxyhalides and the alkoxyhalides of titanium or vanadium such as titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, vanadium tetrachloride, vanadyl trichloride, monobutoxyvanadyl dichloride, dibutoxyvanadyl dichloride, and mixtures thereof. Of these compounds, the compounds of titanium and/or vanadium having at least 3 carbon atoms are preferred. More preferred compounds are titanium tetrachloride and vanadium tetrachloride.

The reaction between the organomagnesium compound (1) and the titanium and/or vanadium compound (2) is conducted in an inert reaction medium including an aliphatic hydrocarbon such as hexane or heptane, an aromatic hydrocarbon such as benzene, toluene or xylene, and an alicyclic hydrocarbon such as cyclohexane or methylcyclohexane at a temperature of from about −30° to about 100° C., preferably from about −20° C. to about 50° C. In order to achieve high activity it is recommended that the reaction ratio of the two components ranges from 0.05 mole to 50 moles, especially from 0.2 mole to 10 moles of the organomagnesium compound (1) per mole of the titanium and/or vanadium compound (2).

The composition and the structure of the solid catalyst component [A] obtained in the above described reaction may be varied within wide limits depending upon factors such as the starting materials selected and the reaction conditions employed. Typically the mole ratio of Mg/(Ti and/or V) of the solid catalyst component [A] is in the range of from 0.2 to 10. A preferred mole ratio of Mg/(Ti and/or V) is in the range of 0.5 to 5. The solid catalyst component [A] thus obtained has a very large specific surface area. In accordance with the measurement by the B.E.T. method, the specific surface area ranges from about 50 m$^2$/g to about 400 m$^2$/g.

The inorganic or organic compound (3) of aluminum, silicon, tin or antimony which is additionally reacted with the solid catalyst component [A] before being reacted with the organometal component [B] is a compound having a halogen atom, a hydrogen atom, a hydrocarbon group, an alkoxy group or an aryloxy group. Suitable examples of such compounds include an alkoxyaluminum dihalide, an alkylaluminum dihalide, a monoalkoxysilicon halide, a monoalkylsilicon halide, a silicon tetrahalide, a monoalkoxytin halide, a monoalkyltinhalide, a tin tetrahalide, antimony pentachloride and a monoalkylantimony halide. Of these compounds, an alkylaluminum dihalide, silicon tetrachloride and tin tetrachloride are preferred.

The titanium or vanadium compound (4) which is additionally reacted with the solid catalyst component [A] before being reacted with the organometal component [B] may be the same as the titanium and/or vanadium compound (2). It is preferred that the titanium or vanadium compound (4) has at least 3 halogen atoms. Titanium tetrachloride and vanadium tetrachloride are more preferred.

The reaction between the solid catalyst [A] and the inorganic or organic compound (3) or the titanium or vanadium compound (4) is conducted in a ratio of 1 g of [A] to 1 mmole to 100 mmoles of the compound (3) or the compound (4), preferably 1 g of [A] to 2 mmoles to 50 mmoles of the compound (3) or the compound (4) in the presence or absence of an inert hydrocarbon medium at a temperature of from about 10° C. to about 150° C. for about 1 to about 50 hours. After completion of the reaction, it is preferred that the solid type catalyst component [A'] formed is isolated and washed with the inert hydrocarbon medium. The above described reaction can be conducted multi-step-wise, i.e., in two or three steps by using the same or different compound (3) or compound (4). Exemplary inert hydrocarbon media include an aliphatic hydrocarbon such as hexane or heptane, an aromatic hydrocarbon such as benzene or toluene and an alicyclic hydrocarbon such as cyclohexane or methlcyclohexane.

The solid catalyst component [A] or the solid type catalyst component [A'] of this invention as such is useful as a catalyst for polymerizing α-olefins. However, the solid catalyst component [A] or the solid type catalyst component [A'] of this invention in combination with an organometal compound [B] becomes a more improved catalyst.

The organometal compound [B] which can be employed in this invention is a compound of a metal of Groups I to III of the Periodic Table, and especially an organoaluminum compound and an organomagnesium complex are preferred. As the organoaluminum compounds, those represented by the general formula, $AlR_m^8 Y_{3-m}$ 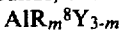

wherein

R$^8$ is a hydrocarbon group having 1 to 20 carbon atoms,

Y is a member selected from a hydrogen atom, a halogen atom, an alkoxy group having 1 to 20 carbon atoms, a phenoxy group, a substituted phenoxy group, and a siloxy group, and m is a number from 2 to 3, can be employed individually or as a mixture. In the above formula, the hydrocarbon groups having 1 to 20 carbon atoms represented by R$^8$ include aliphatic hydrocarbons, aromatic hydrocarbons and alicyclic hydrocarbons.

Exemplary organoaluminum compounds include triethylaluminum, tri-n-propylaluminum, triisopropylaluminum, tri-n-butylaluminum, triisobutylaluminum, trihexylaluminum, trioctylaluminum, tridecylaluminum, tridodecylaluminum, trihexadecylaluminum, diethylaluminum, hydride, diisobutylaluminum hydride, diethylaluminum ethoxide, diisobutylaluminum ethoxide, dioctylaluminum butoxide, diisobutylaluminum octyloxide, diethylaluminum chloride, diisobutylaluminum chloride, dimethylhydrosiloxyaluminum dimethyl, ethylmethylhydrosiloxyaluminum diethyl and ethyldimethylsiloxyaluminum diethyl and mixtures thereof.

As the organomagnesium complexes, those represented by the general formula, $Mg_d M_e R_f^9 R_h^{10}$ 

wherein

M is a metal atom selected from the group consisting of aluminum, boron, beryllium and zinc;

R$^9$ and R$^{10}$ may be the same or different and each is a hydrocarbon group having 1 to 10 carbon atoms;

d and e each is a number above zero;

f and h each is zero or a number above zero and both are not zeros simultaneously;

d/e = 1 to 8; and $2d + \alpha e = f + h$, wherein α is the valence of M, can be employed individually, or as a mixture.

Of these groups, preferred hydrocarbon groups represented by R$^9$ and R$^{10}$ are alkyl groups, cycloalkyl groups and aryl groups such as a methyl group, an ethyl group, a propyl group, a butyl group, a pentyl group, a hexyl group, a decyl group, a cyclohexyl group and a phenyl group. An alkyl group is especially preferred as R$^9$. Of the metal atoms, aluminum and zinc are preferred.

These organomagnesium complexes are easily prepared by using the method disclosed in patents such as U.S. Pat. Nos. 4,004,071, 4,027,089, 3,989,878 and 4,120,883, and the documents such as Annalen der Chemie, 605, 93–97 (1957), J. Chem. Soc., 1964, 2483–85, Chemical Communication, 1966, 559, and J. Org. Chem., 34, 1116 (1969).

A combination of these organometal compounds [B] with the above mentioned solid catalyst component [A] or solid type catalyst component [A'] provides a highly active catalyst, and especially a trialkylaluminum and a dislkylaluminum hydride as the organometal compound [B] are preferred because they show the highest activity. The activity tends to decrease upon introduction of an electronegative group represented by Y into the trialkylaluminum or the dialkylaluminum hydride. However, such organoaluminum compounds containing the Y group show unique polymerization behaviors, respectively, to produce useful polymers with a high activity. For example, introduction of an alkoxy group render control of the molecular weight of polymers easy. Since the presence of halogen atoms in the polymerization system and in the polymers produced is not desirable, an alkoxy group and an siloxy group is preferred as the Y group.

The solid catalyst component [A] and the organometal component [B] may be added under the polymerization conditions to the polymerization system or may be combined prior to the polymerization.

It is preferred that the ratio of these two components ranges from 1 mmole to 3000 mmoles of the organometal compound [B] per gram of the solid catalyst component [A].

The halogenated hydrocarbons which can be employed in combination with the solid catalyst component [A] or the solid type catalyst component [A'] together with the organometal compound [B] in order to give polymers having a broad molecular weight distribution with high catalytic activity are saturated or unsaturated halogenated hydrocarbons having 1 to 15 carbon atoms. It is preferred that the number of halogen atoms of the halogenated hydrocarbons is at most twice that of carbon atom of the halogenated hydrocarbons. Exemplary halogenated hydrocarbons include dichloromethane, 1,2-dichloroethane, 1,1,2-trichloroethane, 1,1,2,2-tetrachloroethane, 1,2-dichloropropane, 1,3-dichloropropane, 1,2,3-trichloropropane, n-butyl chloride, isobutyl chloride, 1,4-dichlorobutane, 2,3-dichlorobutane, 1,2,3,4-tetrachlorobutane, n-hexyl chloride, 1,6-dichlorohexane, 1,2-dichlorooctane, dibromomethane, 1,2-dibromoethane, n-butyl bromide, chlorobenzene, phenethyl chloride, allyl chloride, bromobenzene and ethyl iodide.

The combination of these halogenated hydrocarbons [C] with the above described solid catalyst component [A] or solid type catalyst component [A'] and the organometal compound [B] may be conducted under the reaction conditions with the passage of the polymerization or may be conducted prior to the polymerization. Also, the polymerization can be carried out by using the reaction product obtained by reacting the solid catalyst component [A] or solid type catalyst component [A'] with the halogenated hydrocarbon [C] and isolating the solid formed, and the organometal compound with or without further addition of the same or different halogenated hydrocarbon. it is preferred that the ratio of these catalyst components ranges from 1 mmole to 3000 mmoles of the organometal compound [B] per gram of the solid catalyst component [A] and 1 mmole to 3000 mmoles of the halogenated hydrocarbon per gram of the solid catalyst component [A] and the mole ratio of the halogenated hydrocarbon [C] to the organoaluminum compound [A] ranges 0.01 to 100, especially 0.1 to 20.

DETAILED DESCRIPTION OF THE POLYMERIZATION

The olefins polymerized by using the present catalyst may be α-olefins, especially ethylene. Further, the present catalysts may be employed for copolymerizing ethylene and other monoolefins such as propylene, butene-1 and hexane-1 and dienes such as butadiene and isoprene. Also propylene may be polymerized with good efficiency by employing the present catalysts.

As for the polymerization method, there may be employed the usual suspension-, solution- and gas phase-polymerizations. In the cases of suspension- and solution-polymerizations, the catalyst is introduced into a reactor together with a polymerization medium including an aliphatic hydrocarbon such as hexane or heptane; an aromatic hydrocarbon such as benzene, toluene or xylene; or an alicyclic hydrocarbon such as cyclohexane or methylcyclohexane, and, an α-olefin is added under a pressure of about 1 to about 200 Kg/cm² in an inert atmosphere and allowed to polymerize at a temperature from about 10° C. to about 300° C.

For gas phase-polymerization, it is possible to carry out polymerization under an α-olefin pressure of about 1 to about 50 Kg/cm² and a temperature from about 10° C. to about 120° C., using a fluidized bed, moving bed or mixing with a stirrer to provide better contact between the α-olefin and the catalyst.

There may be employed single stage polymerization having one polymerization zone or multistage polymerization having a plurality of polymerization zones.

When multiple stage polymerization is effected in at least two polymerization zones having different polymerizaton conditions, by using the present catalyst it is possible to produce a polymer whose molecular weight distribution is much broader.

In order to control the molecular weight of the polymer, it is also possible to add hydrogen, a halogenated hydrocarbon or an organometalic compound which can cause chain transfer.

The following examples of preferred embodiments further illustrate the principle and practice of the invention.

In the following example

Mw is the weight average molecular weight determined according to the following equation;

$$[\eta] = 6.8 \times 10^{-4} M_w^{0.67}$$

[see Journal of Polymer Science, 36, 91 (1957)];

Mw/Mn is the index of molecular weight distribution measured by gel permeation chromatography; and the term "catalytic efficiency" shows the amount of polymer formed per gram of catalyst per hour of reaction time per Kg/cm² of α-olefin pressure.

EXAMPLE 1

(I) Synthesis of Organomagnesium Compound (1):
Synthesis 1

In a 1 l flask purged with nitrogen were charged 6.1 g (250 mmoles) of magnesium powder, and then 1/10 of 300 ml of a n-heptane solution containing 250 mmoles of $C_2H_5Br$ was added thereto. On stirring at an internal temperature of the flask of 90° C., the reaction was started after about 10 minutes. To the reaction mixture solution was added the rest of the n-heptane solution over 2 hours with stirring while keeping the internal temperature of the flask at 90° C., and further the reaction was continued at 90° C. for one hour. Then 200 ml of a heptane solution containing 1 mole/l of n-butyllithium to the reaction solution and the mixture was refluxed under heating for 6 hours. After completion of the reaction, the reaction solution was left to stand and the supernatant liquid was collected. On analysis of Mg and Br, this liquid contained 0.37 mole/l of Mg and less than 0.01 mole/l of Br. Also, the liquid was reacted with iodine in two equivalent amounts of iodine to magnesium atom and the alkyl iodide formed had n-$C_4H_9I/C_2H_5I$ mole ratio of 1.05 according to the analysis by gas chromatography.

(II) Synthesis of Solid Catalyst Compound [A]

The oxygen and moisture present inside a 500 ml flask equipped with two dropping funnels were purged with dry nitrogen, and to the flask were charged 160 ml of n-heptane and cooled to $-5°$ C. Then 80 ml of a heptane solution containing 40 mmoles of the supernatant liquid $Mg(C_2H_5)(n-C_4H_9)(n-C_4H_9Li)_{0.05}$ and 80 ml of a n-heptane solution containing 60 mmoles of titanium tetrachloride were accurately measured and separately charged in the dropping funnels, respectively. Both components were simultaneously added to the flask at $-5°$ C. with stirring over two hours, and further the aging reaction was continued at $5°$ C. for one hour. The solid formed which was insoluble in the hydrocarbon medium was isolated, washed with n-heptane and dried.

(III) Polymerization

In a 1.5 l autoclave evacuated and purged with nitrogen were charged 5 mg of the solid catalyst component [A] and 0.4 mmole of triisobutylaluminum with 0.8 l of dehydrated and deaerated n-heptane. While keeping the internal temperature of the autoclave at $85°$ C., hydrogen was added up to a gauge pressure of 1.6 Kg/cm². Then ethylene was added up to a total gauge pressure of 4.0 Kg/cm². While maintaining the total gauge pressure of 4.0 Kg/cm² by adding additional ethylene, the polymerization was carried out for one hour to give 134 g of a polymer. The polymer had Mw of 125000, Mw/Mn of 10.3, a catalytic efficiency of 11200 and a bulk density of 0.39 g/c.c.

EXAMPLES 2 TO 12

Solid catalyst components [A] were prepared by reacting (1) the organomagnesium compounds as set forth in Table I with (2) the titanium and/or vanadium compounds having at least one halogen atom as set forth in Table I under the reaction conditions as set forth in Table I in the same manner as described in Example 1. Using these solid catalyst components [A] and triisobutylaluminum, polymerization of ethylene was carried out under the same polymerization conditions as in Example 1. The results are shown in Table I.

The organomagnesium compounds (1) as set forth in Table I were prepared as follows;

Synthesis of Organomagnesium Compounds (1):
Synthesis 2

In a 1 l flask purged with nitrogen were charged 6.1 g (250 mmoles) of magnesium powder, and then 1/10 of 400 ml of a n-heptane solution containing 250 mmoles of $C_2H_5Br$ and 250 mmoles of i-$C_4H_9Cl$ was added thereto. On stirring at an internal temperature of the flask of $90°$ C., the reaction was started after about 10 minutes. To the reaction mixture solution was added the rest of the n-heptane solution over 2 hours with stirring while keeping the internal temperature of the flask at $90°$ C., and further the reaction was continued at $90°$ C. for one hour. After completion of the reaction, the reaction solution was left to stand and the supernatant liquid was collected. On analysis of the liquid, the concentration of Mg was 0.51 mole/l and the $C_2H_5/i-C_4H_9$ mole ratio was 1.0.

In a 200 ml flask purged with nitrogen were charged 100 ml of the supernatant liquid as obtained above and then 10 ml of a n-heptane solution containing 31 mmoles of $(CH_3)_2HSiOSiH(CH_3)_2$ were added thereto and the two components were reacted at $80°$ C. for one hour. The reaction solution was cooled to $20°$ C. and then 10 ml of a n-heptane solution containing 2.6 mmoles of $Al(C_2H_5)_3$ were added thereto and the reaction was continued at $30°$ C. for one hour to give an organomagnesium compound which was employed in Example 2.

Synthesis 3

The reaction of 6.1 g (250 mmoles) of magnesium powder, 250 mmoles of i-$C_3H_7Cl$ and 250 mmoles of n-$C_5H_{11}Cl$ was carried out in the same manner as in Synthesis 2 and the precipitates formed in the reaction solution were separated by filtration. The concentration of Mg in the liquid collected was 0.46 mole/l. To 100 ml of the liquid were added 9.2 mmoles of isopropyl alcohol at $30°$ C. and then 1.8 mmoles of $Al(C_2H_5)_2(OC_2H_5)$, and further the reaction was continued for one hour to give an organomagnesium compound which was employed in Example 3.

Synthesis 4

The reaction of 6.1 g (250 mmoles) of magnesium powder, 250 mmoles of n-$C_3H_7Br$ and 250 mmoles of n-$C_7H_{15}Cl$ was carried out in the same manner as in Synthesis 2 and the precipitates formed in the reaction solution were separated by filtration. The concentration of Mg in the liquid collected was 0.42 mole/l. To 100 ml of the liquid were added 4.2 mmoles of $C_2H_5SH$ and the reaction was continued at $50°$ C. for one hour. Then 0.84 mmole of n-$C_4H_9Li$ was added to the reaction solution and further the reaction was continued at $30°$ C. for one hour to give an organomagnesium compound was employed in Example 4.

Synthesis 5

The reaction of 6.1 g (250 mmoles) of magnesium powder, 250 mmoles of n-$C_3H_7Br$ and 250 mmoles of n-$C_6H_{13}Cl$ was carried out in the same manner as in Synthesis 2 and the precipitates formed in the reaction solution were separated by filtration. The concentration of Mg in the liquid collected was 0.44 mole/l. To 100 ml of the liquid were added 13.2 mmoles of ethyl alcohol at $0°$ C. and the reaction was carried out at $60°$ C. for one hour. After the reaction solution was cooled to $30°$ C., 1.76 mmoles of $Zn(C_2H_5)_2$ were added thereto and the reaction was carried out at $30°$ C. for one hour to give an organomagnesium which was employed in Example 5.

Synthesis 6

The reaction of 6.1 g (250 mmoles) of magnesium powder, 250 mmoles of $C_2H_5Br$ and 250 mmoles of n-$C_8H_{17}Cl$ was carried out in the same manner as in Synthesis 2 and the precipitates formed in the reaction solution were separated by filtration. The concentration of Mg in the liquid collected was 0.40 mole/l. To the liquid were added 20 mmoles of n-butyl alcohol and the reaction was carried out at $30°$ C. for one hour. Then 2.4 mmoles of $SiH(CH_3)_3$ were added to the reaction solution and further the reaction was continued at $30°$ C. for one hour to give an organomagnesium compound which was employed in Example 6.

Synthesis 7

The reaction of 6.1 g (250 mmoles) of magnesium powder and 250 mmoles of $C_2H_5Br$ was carried out in the same manner as in Synthesis 1. The reaction solution was further reacted with 185 mmoles of n-$C_6H_{13}Li$. On analysis of the supernatant liquid obtained, the concentration of Mg in the liquid was 0.36 mole/l and the n-$C_6H_{13}/C_2H_5$ mole ratio was 1.02. Then 300 ml of the supernatant liquid were reacted with 108 mmoles of n-$C_8H_{17}OH$ at 40° C. for one hour to give an organomagnesium compound which was employed in Example 7.

Synthesis 8

The reaction of 6.1 g (250 mmoles) of magnesium powder and 250 mmoles of $C_2H_5Br$ was carried out in the same manner as in Synthesis 1. The reaction solution was further reacted with 190 mmoles of n-$C_5H_{11}Li$. On analysis of the supernatant liquid obtained, the concentration of Mg in the liquid was 0.36 mole/l. To 300 ml of the supernatant liquid were added 43.2 mmoles of $(CH_3)_3SiOH$ and the reaction was carried out at 60° C. for one hour to give an organomagnesium compound which was employed in Example 8.

Synthesis 9

In a 1 l flask purged with nitrogen were charged 6.1 g (250 mmoles) and 20 ml of $Al(OC_2H_5)_3$, and then 1/10 of 400 ml of a n-heptane solution containing 250 mmoles of $C_2H_5Br$ and 250 mmoles of n-$C_6H_{13}Cl$ was added thereto. On stirring at an internal temperature of the flask of 90° C., the reaction started after about 15 minutes. To the reaction mixture solution was added the rest of the n-heptane solution over 2 hours with stirring while keeping the internal temperature of the flask at 90° C., and further the reaction was continued at 90° C. for 2 hours. After completion of the reaction, the reaction solution was left to stand and the supernatant liquid was collected. On analysis of the liquid, the concentration of Mg was 0.47 mole/l and the composition of the liquid was $Mg(C_2H_5)(n-C_6H_{13})[Al(OC_2H_5)_3]_{0.09}$ which was employed in Example 9.

Synthesis 10

The reaction of 6.1 g (250 mmoles) of magnesium powder, 244 mmoles of $C_2H_5Br$ and 256 mmoles of n-$C_4H_9Br$ was carried out in the same manner as in Synthesis 2. The concentration of Mg in the supernatant liquid obtained was 0.53 mole/l. To 200 ml of the supernatant liquid were added 26 mmoles of n-butyl alcohol at $-5°$ C. with stirring and the mixture was further stirred at 30° C. for one hour. Then 5.3 mmoles of Al-$(Oi-C_3H_7)_3$ were added thereto and the reaction was carried out at 50° C. for one hour to give an organomagnesium compound which was employed in Example 10.

Synthesis 11

The reaction of 6.1 (250 mmoles) of magnesium powder, 242 mmoles of $C_2H_5Br$ and 258 mmoles of n-$C_4H_9Br$ was carried out in the same manner as in Synthesis 2. The concentration of Mg in the supernatant liquid obtained was 0.53 mole/l. To 200 ml of the supernatant liquid were added 59 mmoles of n-butyl alcohol at $-5°$ C. with stirring and the mixture was further stirred at 30° C. for one hour. Then 5.3 mmoles of Al-$(Oi-C_3H_7)_3$ were added thereto and the reaction was carried out at 50° C. for one hour to give an organomagnesium compound which was employed in Example 11.

Synthesis 12

The reaction of 6.1 (250 mmoles) of magnesium powder, 240 mmoles of $C_2H_5Br$ and 260 mmoles of n-$C_4H_9Br$ was carried out in the same manner as in Synthesis 2. The concentration of Mg in the supernatant liquid was 0.53 mole/l. To 200 ml of the supernatant liquid were added 96 mmoles of n-butyl alcohol at $-5°$ C. with stirring and the mixture was further stirred at 30° C. for one hour. Then 5.3 mmoles of $Al(Oi-C_3H_7)_3$ were added thereto and the reaction was carried out at 50° C. for one hour to give an organomagnesium compound which was employed to Example 12.

TABLE I

| Example | Organomagnesium Compound (1) (mmole) | Titanium and/or Vanadium Compound (2) (mmole) | Addition Conditions Temperature (°C.) | Addition Conditions Time (hour) | Aging Conditions Temperature (°C.) | Aging Conditions Time (hour) | Catalytic Efficiency | Mw ($10^5$) | Mw/Mn | Bulk Density (g/c.c.) |
|---|---|---|---|---|---|---|---|---|---|---|
| 2 | $Mg(C_2H_5)_{0.7}(i-C_4H_9)_{0.7}\{OSiH(CH_3)_2\}_{0.6}$ $[Al(C_2H_5)_3]_{0.05}$ 80 | $TiCl_4$ 80 | $-10$ | 3 | 5 | 1 | 8200 | 1.21 | 6.5 | 0.39 |
| 3 | $Mg(i-C_3H_7)_{0.9}(n-C_5H_{11})_{0.9}(Oi-C_3H_7)_{0.2}$ $[Al(C_2H_5)_2(OC_2H_5)]_{0.04}$ 50 | $TiCl_4$ 80 | 5 | 1 | 5 | 3 | 8700 | 0.94 | 4.8 | 0.41 |
| 4 | $Mg(n-C_3H_7)_{0.95}(n-C_7H_{15})_{0.95}(SC_2H_5)_{0.1}$ $[n-C_4H_9Li]_{0.02}$ 40 | $TiCl_{3.5}(On-C_4H_9)_{0.5}$ 60 | $-20$ | 4 | 10 | 2 | 6600 | 0.89 | 4.4 | 0.31 |
| 5 | $Mg(n-C_3H_7)_{0.85}(n-C_6H_{13})_{0.85}(OC_2H_5)_{0.3}$ $[Zn(C_2H_5)_2]_{0.04}$ 40 | $TiCl_3(Oi-C_3H_7)$ 30 $VCl_4$ 20 | $-5$ | 4 | 20 | 1 | 7100 | 1.72 | 5.4 | 0.37 |
| 6 | $Mg(C_2H_5)_{0.75}(n-C_8H_{17})_{0.75}(On-C_4H_9)_{0.5}$ $[SiH(CH_3)_3]_{0.06}$ 40 | $TiCl_4$ 30 | 0 | 2 | 10 | 20 | 9200 | 1.15 | 6.1 | 0.38 |
| 7 | $Mg(C_2H_5)_{0.8}(n-C_6H_{13})_{0.8}(On-C_8H_{17})_{0.4}$ $(n-C_6H_{13}Li)_{0.02}$ 60 | $TiCl_4$ 30 | 10 | 1 | 30 | 2 | 7700 | 1.06 | 5.8 | 0.38 |
| 8 | $Mg(C_2H_5)_{0.8}(n-C_5H_{11})_{0.8}\{OSi(CH_3)_3\}_{0.4}$ $(n-C_5H_{11}Li)_{0.03}$ 30 | $TiCl_4$ 60 | 5 | 8 | — | — | 6600 | 0.97 | 6.3 | 0.28 |
| 9 | $Mg(C_2H_5)(n-C_6H_{13})\cdot[Al(OC_2H_5)_3]_{0.09}$ 30 | $TiCl_4$ 90 | $-5$ | 4 | $-5$ | 1 | 12500 | 1.72 | 8.4 | 0.39 |
| 10 | $Mg(C_2H_5)_{0.86}(n-C_4H_9)_{0.90}(On-C_4H_9)_{0.24}$ $[Al(Oi-C_3H_7)_3]_{0.05}$ 80 | $TiCl_4$ 80 | $-10$ | 3 | 5 | 1 | 8700 | 1.05 | 5.8 | 0.42 |
| 11 | $Mg(C_2H_5)_{0.70}(n-C_4H_9)_{0.74}(On-C_4H_9)_{0.56}$ $[Al(Oi-C_3H_7)_3]_{0.05}$ 80 | $TiCl_4$ 80 | $-10$ | 3 | 5 | 1 | 9500 | 0.92 | 5.3 | 0.43 |
| 12 | $Mg(C_2H_5)_{0.48}(n-C_4H_9)_{0.52}(On-C_4H_9)_{0.90}$ | $TiCl_4$ | $-10$ | 3 | 5 | 1 | 5100 | 0.75 | 5.0 | 0.33 |

TABLE I-continued

| Example | Organomagnesium Compound (1) (mmole) | Titanium and/or Vanadium Compound (2) (mmole) | Reaction Conditions | | | | Results of Polymerization | | | |
|---|---|---|---|---|---|---|---|---|---|---|
| | | | Addition Conditions | | Aging Conditions | | | | | |
| | | | Temperature (°C.) | Time (hour) | Temperature (°C.) | Time (hour) | Catalytic Efficiency | Mw (10$^5$) | Mw/Mn | Bulk Density (g/c.c.) |
| | [Al(Oi-C$_3$H$_7$)$_3$]$_{0.05}$ 80 | 80 | | | | | | | | |

EXAMPLES 13 TO 21

Polymerization of ethylene was carried out under the same polymerization conditions as in Example 1, except that the organometal compounds [B] and the halogenated hydrocarbons [C] as set forth in Table II were used instead of the triisobutylaluminum. The results are shown in Table II.

TABLE II

| Example | Organoaluminum Compound [B] (mmole) | Halogenated Hydrocarbon [C] (mmole) | | Catalytic Efficiency | Mw (10$^5$) | Mw/Mn |
|---|---|---|---|---|---|---|
| 13 | Al(C$_2$H$_5$)$_3$ | 0.2 ClCH$_2$CH$_2$Cl | 0.4 | 8900 | 1.83 | 19.6 |
| 14 | Al(C$_2$H$_5$)$_3$ | 0.2 BrCH$_2$CH$_2$Br | 0.1 | 9200 | 2.07 | 18.9 |
| 15 | Al(i-C$_4$H$_9$)$_3$ | 0.4 CH$_2$Cl$_2$ | 0.4 | 9000 | 2.15 | 20.3 |
| 16 | Al(i-C$_4$H$_9$)$_2$H | 0.4 — | | 13000 | 1.35 | 9.6 |
| 17 | Al(n-C$_8$H$_{17}$)$_3$ | 0.8 CH$_3$CH$_2$CHClCH$_2$Cl | 0.2 | 9300 | 1.64 | 17.6 |
| 18 | Al(C$_2$H$_5$)$_{2.6}$(OC$_2$H$_5$)$_{0.4}$ | 1.0 — | | 6900 | 1.73 | 13.2 |
| 19 | Al(C$_2$H$_5$)$_{2.9}$(OSi.H.CH$_3$.C$_2$H$_5$)$_{0.1}$ | 1.0 — | | 6700 | 1.91 | 12.8 |
| 20 | AlMg(C$_2$H$_5$)$_3$.(n-C$_4$H$_9$)$_2$ | 0.8 CH$_2$CHCl | 0.8 | 8900 | 1.94 | 18.2 |
| 21 | AlMg$_6$(C$_2$H$_5$)$_3$.(n-C$_4$H$_9$)$_{12}$ | 1.5 — | | 11000 | 1.10 | 12.3 |

EXAMPLES 22 TO 31

2 g of the same solid catalyst component [A] as prepared in Example 2 were reacted with the component (3) and/or the component (4) as set forth in Table III under the reaction conditions as set forth in Table III to give solid type catalyst components [A']. Polymerizaton of ethylene was carried out under the same polymerization conditions as in Example 1, by using 5 mg of the solid type catalyst as obtained above and the organoaluminum compound [B] and the halogenated hydrocarbon [C] as set forth in Table III. The results are shown in Table III.

TABLE III

| Example | Reaction Conditions | | | | Polymerization Conditions | | Results of Polymerization | | | |
|---|---|---|---|---|---|---|---|---|---|---|
| | Component (3)* and/or (4)** (mmole) | Heptane (ml) | Temperature (°C.) | Time (hour) | Organometal Compound [B] (mmole) | Halogenated Hydrocarbon [C] (mmole) | Catalytic Efficiency | Mw (10$^5$) | Mw/Mn | Bulk Density (g/c.c.) |
| 22 | Al(C$_2$H$_5$)Cl$_2$ 16 | 100 | 80 | 2 | Al(i-C$_4$H$_9$)$_2$H 0.5 | — | 7600 | 1.71 | 15.6 | 0.42 |
| 23 | Al(i-C$_4$H$_9$)$_2$Cl 40 | 100 | 80 | 3 | Al(i-C$_4$H$_9$)$_3$ 0.5 | — | 8200 | 1.82 | 16.6 | 0.44 |
| 24 | SiH.(CH$_3$).Cl$_2$ 8 | 100 | 30 | 20 | Al(i-C$_4$H$_9$)$_3$ 0.3 | n-C$_4$H$_9$Cl 0.6 | 6900 | 1.56 | 18.7 | 0.43 |
| 25 | SiCl$_4$ 24 | 50 | 50 | 6 | Al(i-C$_4$H$_9$)$_3$ 0.3 | C$_6$H$_5$CH$_2$Cl 0.2 | 6600 | 1.73 | 19.2 | 0.44 |
| 26 | SnCl$_4$ 35 | 50 | 50 | 6 | Al(C$_2$H$_5$)$_2$H 0.3 | — | 7600 | 2.03 | 15.4 | 0.46 |
| 27 | SbCl$_5$ 40 | 200 | 80 | 4 | Al(C$_2$H$_5$)$_{2.7}$(OC$_2$H$_5$)$_{0.3}$ 1.0 | — | 5800 | 1.08 | 17.2 | 0.42 |
| 28 | TiCl$_4$ 15 | 200 | 80 | 8 | Al(n-C$_4$H$_9$)$_3$ 0.2 | Cl$_2$CHCH$_2$Cl 0.6 | 8900 | 1.99 | 19.2 | 0.46 |
| 29 | VCl$_4$ 20 | 200 | 50 | 3 | Al.Mg(C$_2$H$_5$)$_3$(n-C$_4$H$_9$)$_2$ 0.8 | — | 6900 | 1.42 | 13.6 | 0.39 |
| 30 | TiCl$_4$ 20 Al(On-C$_4$H$_9$)Cl$_2$ 20 | 100 | 50 | 1 | Al(n-C$_8$H$_{17}$)$_3$ 0.8 | — | 8100 | 1.87 | 14.1 | 0.44 |
| 31 | TiCl$_4$ 100 | — | 130 | 4 | Al(i-C$_4$H$_9$)$_3$ 0.2 | — | 7200 | 2.21 | 15.2 | 0.46 |
| 32 | TiCl$_4$ 15 | 200 | 80 | 5 | Zn.Mg(C$_2$H$_5$)$_2$(n-C$_4$H$_9$)$_2$ 1.0 | CH$_2$Cl$_2$ 1.0 | 6200 | 1.25 | 18.5 | 0.42 |

*Inorganic or organic compound (3) of aluminum, silicon, tin or antimony
**Titanium or vanadium compound (4)

EXAMPLE 32

2 g of the same solid catalyst component [A] as prepared in Example 8 were reacted with 8 mmoles of Al(C$_2$H$_5$)Cl$_2$ in 100 ml of n-heptane at 80° C. for 2 hours. After completion of the reaction, the supernatant liquid was removed from the reaction mixture solution and the residue was washed twice with n-heptane. Then 10 mmoles of TiCl$_4$ and 50 ml of n-heptane were added to the residue, and the reaction was carried out at 80° C. for one hour and the solid type catalyst component [A'] formed was isolated. Polymerization of ethylene was carried out under the same polymerization conditions as in Example 1, by using the above obtained solid catalyst to give 87 g of a polymer. The polymer had a catalytic efficiency of 7250, a Mw of 193000, a Mw/Mn of 16.3 and a bulk density of 0.47 g/c.c.

EXAMPLES 33 TO 34 AND COMPARATIVE EXAMPLES 1 AND 2

In a 3 l flask purged with nitrogen were charged 18.3 g (750 mmoles) of magnesium powder, and then 1/10 of 1.5 l of a n-heptane solution containing 750 mmoles of $C_2H_5Br$ and 750 mmoles of n-$C_4H_9Cl$ was added thereto. On stirring at an internal temperature of the flask of 90° C., the reaction was started after about 10 minutes. To the reaction mixture solution was added the rest of the n-heptane solution over 3 hours with stirring while keeping the internal temperature of the flask at 90° C., and further the reaction continued at 90° C. for one hour. After completion of the reaction, the reaction solution was left to stand and the supernatant liquid was collected. On analysis of this liquid, the concentration of Mg was 0.51 mole/l and the mole ratio of $C_2H_5$/n-$C_4H_9$ was 1.0. In a 2 l flask purged with nitrogen were charged 1 l of the above-obtained liquid, and then 168 mmoles of n-$C_4H_9OH$ was added thereto at $-10°$ C. with stirring and further the reaction was continued at 30° C. for one hour. To 200 ml of the liquid obtained was added triethylaluminum in an amount as set forth in Table IV to give an organomagnesium compound (1) as set forth in Table IV.

The oxygen and moisture present inside a 500 ml flask equipped with two dropping funnels were purged with dry nitrogen, and to the flask were charged 160 ml of n-heptane and cooled to $-5°$ C. Then 80 ml of a n-heptane solution containing 40 mmoles of the organomagnesium compound (1) as set forth in Table IV and 80 ml of a n-heptane solution containing 40 mmoles of titanium tetrachloride were accurately measured and separately charged in the dropping funnels, respectively. Both components were simultaneously added to the flask at $-5°$ C. with stirring over two hours, and further the aging reaction was continued at 5° C. for one hour. The solid formed which was insoluble in the hydrocarbon medium was isolated, washed with n-heptane and dried to give a solid catalyst component [A].

Using 5 mg of the solid catalyst component [A] and 0.4 mmole of triethylaluminum as the organoaluminum compound [B], polymerization of ethylene was carried out under the same polymerization conditions as in Example 1. The results are shown in Table IV.

COMPARATIVE EXAMPLE 3

The reaction of 6.1 g (250 mmoles) of magnesium powder and 400 ml of a n-heptane solution containing 250 mmoles of n-$C_{12}H_{25}Br$ was carried out at 90° C. for three hours in the same manner as in Synthesis 1. The reaction solution was left to stand and the supernatant liquid was collected. On analysis of the liquid, the concentration of Mg was 0.38 mole/l and that of Br was 0.38 mole/l.

The oxygen and moisture present inside a 500 ml flask equipped with a dropping funnel were purged with dry nitrogen, and to the flask were charged 200 ml of a n-heptane solution containing 40 mmoles of the supernatant liquid and cooled to $-5°$ C. Then 50 ml of a n-heptane solution containing 40 ml of titanium tetrachloride were accurately measured, charged in the dropping funnel and added dropwise to the flask at $-5°$ C. with stirring over two hours and further the aging reaction was continued at 5° C. for one hour. The solid formed which was insoluble in the hydrocarbon medium was isolated, washed with n-heptane and dried.

Using 5 mg of the solid catalyst component [A] as obtained above 0.4 mmoles of trioctylaluminum as the organoaluminum compound [B], polymerization of ethylene was carried out under the same polymerization conditions as in Example 1. The results are shown in Table IV.

TABLE IV

|  | $Al(C_2H_5)_3$ (mmoles) | Organomagnesium Compound (1) | Organoaluminum Compound [B] | Result of Polymerization ||||
|---|---|---|---|---|---|---|---|
|  |  |  |  | Catalytic Efficiency | Mw ($10^5$) | Mw/Mn | Bulk Density (g/c.c.) |
| Example |  |  |  |  |  |  |  |
| 33 | 2.0 | $Mg(C_2H_5)_{0.8}(n-C_4H_9)_{1.2}$ $(On-C_4H_9)_{0.4}[Al(C_2H_5)_3]_{0.05}$ | $Al(C_2H_5)_3$ | 8600 | 0.9 | 5.5 | 0.41 |
| 34 | 37.8 | $Mg(C_2H_5)_{0.8}(n-C_4H_9)_{1.8}$ $(On-C_4H_9)_{0.4}[Al(C_2H_5)_3]_{0.09}$ | $Al(C_2H_5)_3$ | 10500 | 0.9 | 5.7 | 0.40 |
| Comparative Example |  |  |  |  |  |  |  |
| 1 | 0 | $Mg(C_2H_5)_{0.8}(n-C_4H_9)_{0.8}$ $(On-C_4H_9)_{0.4}$ | $Al(C_2H_5)_3$ | 6700 | 0.8 | 6.4 | 0.31 |
| 2 | 84.0 | $Mg(C_2H_5)_{0.8}(n-C_4H_9)_{0.8}$ $(On-C_4H_9)_{0.4}[Al(C_2H_5)_3]_{0.2}$ | $Al(C_2H_5)_3$ | 16700 | 0.8 | 5.9 | 0.35 |
| 3 | — | $(n-C_{12}H_{25})MgBr$ | $Al(n-C_8H_{17})_3$ | 1250 | 0.7 | 6.6 | 0.30 |

It will be appreciated that the instant specification and examples are set forth by way of illustration and not limitation, and that various modifications and changes may be made without departing from the spirit and scope of the present invention.

What is claimed is:

1. A catalyst suitable for polymerizing an α-olefin, comprising a solid catalyst component (A) and an organocompound selected from the group consisting of an organometal, organoboron and organosilicon compound (B), the solid catalyst component (A) being prepared by reacting an organomagnesium compound (1) soluble in a hydrocarbon medium and represented by the general formula, $MgR_p^1R_q^2X_r \cdot Z_s$ wherein $R^1$ is a hydrocarbon group having 2 to 3 carbon atoms;

$R^2$ is a hydrocarbon group having 4 to 20 carbon atoms and the difference in number of carbon atoms between $R^1$ and $R^2$ is at least 2;

X is an electronegative group having an oxygen atom, a nitrogen atom or a sulfur atom;

Z is an organocompound of aluminum, boron, beryllium, zinc, silicon or lithium;

p and q each is a number above 0 to 1;

r is a number from 0 to 1;

p+q+r=2; and s is a number from 0.02 to 0.09 with a titanium and/or vanadium compound (2) having at least one halogen atom directly connected to the titanium and/or vanadium.

2. The catalyst of claim 1, wherein $R^1$ is a member selected from the group consisting of an ethyl group, a n-propyl group and an isopropyl group.

3. The catalyst of claim 1, wherein $R^2$ is a member selected from the group consisting of a butyl group, a pentyl group, a hexyl group, a heptyl group, an octyl group, a nonyl group, a decyl group, a dodecyl group and a hexadecyl group.

4. The catalyst of claim 1, wherein $R^1$ is an ethyl group and $R^2$ is butyl group.

5. The catalyst of claim 1, wherein $R^1$ is an ethyl group and $R^2$ is a pentyl group.

6. The catalyst of claim 1, wherein $R^1$ is an ethyl group and $R^2$ is a hexyl group.

7. The catalyst of claim 1, wherein X is a member selected from the group consisting of an alkoxy group having 1 to 20 carbon atoms, a siloxy group, a phenoxy group, a substituted phenoxy group, an amino group, an amido group, an

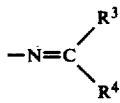

group wherein $R^3$ and $R^4$ may be the same or different and each is a hydrocarbon group having 1 to 20 carbon atoms, and $SR^5$ group wherein $R^5$ is a hydrocarbon group having 1 to 20 carbon atoms, and a β-ketoacid group.

8. The catalyst of claim 7, wherein X is an alkoxy group having 1 to 20 carbon atoms.

9. The catalyst of claim 7, wherein X is a siloxy group.

10. The catalyst of claim 1, wherein r is a number from 0 to 0.6.

11. The catalyst of claim 10, wherein r is a number from 0.2 to 0.6.

12. The catalyst of claim 1, wherein Z is an organoaluminum compound of the general formula, $AlR^6{}_n(OR^7)_{3-n}$ wherein $R^6$ and $R^7$ may be the same or different and each is a hydrocarbon group having 1 to 20 carbon atoms, and n is a number from 0 to 3.

13. The catalyst of claim 1, wherein the titanium and/or vanadium compound (2) has at least 3 halogen atoms directly connected to the titanium and/or vanadium.

14. The catalyst of claim 1, wherein the mole ratio of the organomagnesium compound (1) to the titanium and/or vanadium compound (2) [Mg/(Ti and/or V)] is 0.2 to 10.

15. The catalyst of claim 14, wherein the mole ratio of the organomagnesium compound (1) to the titanium and/or vanadium compound (2) [Mg/(Ti and/or V)] is 0.5 to 5.

16. The catalyst of claim 1, wherein the organometal compound [B] is an organoaluminum compound of the general formula, $AlR^8{}_mY_{3-m}$ wherein $R^8$ is a hydrocarbon group having 1 to 20 carbon atoms Y is a member selected from the group consisting of a hydrogen atom, a halogen atom, an alkoxy group having 1 to 20 carbon atoms, a phenoxy group, a substituted phenoxy group and a siloxy group and m is a number from 2 to 3.

17. The catalyst of claim 16, wherein the organometal compound is a trialkylaluminum.

18. The catalyst of claim 16, wherein the organometal compound is a dialkylaluminum hydride.

19. The catalyst of claim 1, wherein the organometal compound [B] is an organomagnesium complex of the general formula, $Mg_dM_eR^9{}_fR^{10}{}_h$ wherein M is a metal atom selected from the group consisting of aluminum, boron, beryllium and zinc;

$R^9$ and $R^{10}$ may be the same or different and each is a hydrocarbon group having 1 to 10 carbon atoms;

d and e each is a number above zero;

f and h each is zero or a number above zero but both are not zeros simultaneously;

d/e=1 to 8; and $2d+\alpha e=f+h$, wherein α is the valence of M.

20. The catalyst of claim 19, wherein M is aluminum.

21. The catalyst of claim 19, wherein M is zinc.

22. The catalyst of claim 1, additionally containing [C] a halogenated hydrocarbon having 1 to 15 carbon atoms, the number of halogen atom being at most twice that of carbon atom and the mole ratio of the halogenated hydrocarbon [C] to the organometal compound [B] being 0.01 to 100.

23. The catalyst of claim 1 or 22, wherein the solid catalyst component (A) before being reacted with the organometal compound (B) is additionally reacted with an inorganic or organic compound (3) of aluminum, silicon, tin or antimony having at least one halogen atom directly connected to the aluminum, silicon, tin or antimony and being soluble in a hydrocarbon medium, in a ratio of 1 g of (A) to 2 mmoles to 10 mmoles of the compound (3) at a temperature of from about 10° C. to about 150° C.

24. The catalyst of claim 1 or 22, wherein the solid catalyst component (A) before being reacted with the organometal compound (B) is additionally reacted with a titanium or vanadium compound (4) having at least one halogen atom directly connected to the titanium or vanadium in a ratio of 1 g of (A) to 2 to 10 mmoles of the compound (4) at a temperature of from about 10° C. to about 150° C.

25. The catalyst of claim 1, wherein Z is an organolithium compound.

26. The catalyst of claim 1, wherein Z is an organoaluminum compound.

27. The catalyst of claim 1, wherein Z is an organoboron compound.

28. The catalyst of claim 1, wherein Z is an organoberyllium compound.

29. The catalyst of claim 1, wherein Z is an organozinc compound.

30. The catalyst of claim 1, wherein Z is an organosilicon compound.

* * * * *